(12) United States Patent
Hecker et al.

(10) Patent No.: US 10,654,462 B2
(45) Date of Patent: May 19, 2020

(54) METHOD AND CONTROL DEVICE FOR AVOIDING AN OVERHEATING OF A BRAKE OF A VEHICLE

(71) Applicant: KNORR-BREMSE Systeme fuer Nutzfahrzeuge GmbH, Munich (DE)

(72) Inventors: Falk Hecker, Markgroeningen (DE); Werner Koch, Deggingen (DE); Mathias Mayr, Germering (DE); Robert Theil, Tuerkenfeld (DE); Alexander Werth, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 201 days.

(21) Appl. No.: 15/784,817

(22) Filed: Oct. 16, 2017

(65) Prior Publication Data
US 2018/0037209 A1 Feb. 8, 2018

Related U.S. Application Data

(63) Continuation of application No. PCT/EP2016/058335, filed on Apr. 15, 2016.

(30) Foreign Application Priority Data

Apr. 17, 2015 (DE) .................. 10 2015 105 862

(51) Int. Cl.
*B60T 17/22* (2006.01)
*B60Q 5/00* (2006.01)
(Continued)

(52) U.S. Cl.
CPC ............ *B60T 17/221* (2013.01); *B60Q 5/005* (2013.01); *B60T 7/20* (2013.01); *B60T 8/171* (2013.01);
(Continued)

(58) Field of Classification Search
CPC .......... B60T 17/221; B60T 8/171; B60T 7/20; B60T 8/1708; B60T 17/18; B60T 17/22;
(Continued)

(56) References Cited

U.S. PATENT DOCUMENTS

| | | | |
|---|---|---|---|
| 2002/0104717 A1 | 8/2002 | Borugian | |
| 2004/0036592 A1* | 2/2004 | Vertenten | B60T 17/221 340/453 |

(Continued)

FOREIGN PATENT DOCUMENTS

| | | |
|---|---|---|
| CN | 1199682 A | 11/1998 |
| CN | 1199683 A | 11/1998 |

(Continued)

OTHER PUBLICATIONS

International Search Report (PCT/ISA/210) issued in PCT Application No. PCT/EP2016/058335 dated Jul. 25, 2016 with English translation (Six (6) pages).

(Continued)

*Primary Examiner* — Nga X Nguyen
(74) *Attorney, Agent, or Firm* — Crowell & Moring LLP

(57) ABSTRACT

In a method for avoiding an overheating of a brake of a vehicle, in particular of a commercial vehicle and/or a trailer, a first temperature signal and at least a second temperature signal are read in, with the first temperature signal representing a temperature of the brake and/or of a functional part of the brake, and the at least second temperature signal representing at least one additional temperature of at least one additional brake of the vehicle. An error state of the brake is detected using the first temperature signal and the second temperature signal in order to avoid an overheating of the brake. A control device for carrying out the method is also disclosed.

19 Claims, 2 Drawing Sheets

(51) Int. Cl.
  *B60T 7/20* (2006.01)
  *F16D 66/00* (2006.01)
  *G07C 5/00* (2006.01)
  *G07C 5/08* (2006.01)
  *B60T 17/18* (2006.01)
  *B60T 8/17* (2006.01)
  *B60T 8/171* (2006.01)
  *G06Q 10/00* (2012.01)

(52) U.S. Cl.
  CPC ............ *B60T 8/1708* (2013.01); *B60T 17/18* (2013.01); *B60T 17/22* (2013.01); *F16D 66/00* (2013.01); *G07C 5/006* (2013.01); *G07C 5/008* (2013.01); *G07C 5/0808* (2013.01); *G07C 5/0816* (2013.01); *B60T 2270/406* (2013.01); *F16D 2066/001* (2013.01); *G06Q 10/20* (2013.01)

(58) Field of Classification Search
  CPC . B60T 2270/406; G07C 5/0816; G07C 5/008; G07C 5/0808; G07C 5/006; B60Q 5/005; G06Q 10/20; F16D 2066/001; F16D 66/00
  See application file for complete search history.

(56) References Cited

U.S. PATENT DOCUMENTS

| | | | |
|---|---|---|---|
| 2011/0054758 A1 | 3/2011 | Bae et al. | |
| 2013/0035834 A1* | 2/2013 | Couch | B60C 23/20 701/70 |
| 2013/0328675 A1* | 12/2013 | Roach | B60Q 9/00 340/453 |

FOREIGN PATENT DOCUMENTS

| | | |
|---|---|---|
| CN | 2475637 Y | 2/2002 |
| DE | 44 31 045 A1 | 3/1996 |
| DE | 44 31 045 C2 | 8/1999 |
| DE | 102 43 127 A1 | 3/2004 |
| EP | 2 149 721 A1 | 2/2010 |
| JP | 9-112605 A | 5/1997 |
| JP | 2004-197895 A | 7/2004 |
| RU | 2 513 439 C1 | 4/2014 |
| WO | WO 02/12043 A1 | 2/2002 |
| WO | WO 2010/003244 A1 | 1/2010 |
| WO | WO 2012/045953 A1 | 4/2012 |

OTHER PUBLICATIONS

German-language Written Opinion (PCT/ISA/237) issued in PCT Application No. PCT/EP2016/058335 dated Jul. 25, 2016 (Five (5) pages).
International Search Report (PCT/ISA/210) issued in PCT Application No. PCT/EP2016/058336 dated Jul. 25, 2016 with English translation (Six (6) pages).
German-language Written Opinion (PCT/ISA/237) issued in PCT Application No. PCT/EP2016/058336 dated Jul. 25, 2016 (Five (5) pages).
Russian-language Office Action issued in counterpart Russian Application No. 2017139801/11(069197) dated Sep. 11, 2018 with English translation (14 pages).
Chinese-language Office Action issued in counterpart Chinese Application No. 201680029804.1 dated Aug. 6, 2019 with English translation (13 pages).
Japanese-language Office Action issued in counterpart Japanese Application No. 2017-550570 dated Oct. 9, 2019 with English translation (10 pages).
Hindi-language Office Action issued in counterpart Indian Application No. 201737039037 dated Sep. 29, 2019 with English translation (six (6) pages).

* cited by examiner

METHOD AND CONTROL DEVICE FOR AVOIDING AN OVERHEATING OF A BRAKE OF A VEHICLE

CROSS REFERENCE TO RELATED APPLICATIONS

This application is a continuation of PCT International Application No. PCT/EP2016/058335, filed Apr. 15, 2016, which claims priority under 35 U.S.C. § 119 from German Patent Application No. 10 2015 105 862.6, filed Apr. 17, 2015, the entire disclosures of which are herein expressly incorporated by reference.

This application contains subject matter related to U.S. application Ser. No. 15/784,827, entitled "Method for Increasing the Operational Safety of Functional Parts of a Vehicle Brake Exposed to Thermal Stress" filed on even date herewith.

BACKGROUND AND SUMMARY OF THE INVENTION

The invention relates to a method for avoiding an overheating of a brake of a vehicle, in particular of a utility vehicle, and/or of a trailer. The invention also relates to a corresponding controller.

For operational reasons, a series of, in particular, safety relevant functional parts of brakes, are subject to thermal stress which results from the friction producing installation of brake linings against a brake disk. This can also be brought about inter alia from the temperature changes which usually occur during the driving operation.

These thermal stresses can give rise to mechanical and/or chemical changes in the materials of the functional parts, wherein, for example, so called vitrification of the friction linings of brake linings give rise to a coefficient of friction loss on the frictional face thereof.

Thermal overloading of the functional parts involved can also result from what is referred to as overheating. In this context, no intentional braking occurs but rather the overheating occurs as a result of the brake linings being slightly applied, which on a continuous basis can give rise to thermal damage to the brake linings and the mechanical parts of the disk brake, such as guide elements, seals or the like.

Continuous use of the brake when traveling downhill is also to be considered critical with respect to thermal overloading, and can also give rise to damage to the components involved, such as easy jamming of the activation elements, for example of a brake application device, as a result of which an undesired residual slipping torque is generated, resulting in an excessively high continuous temperature.

In order to detect the temperature in the region of the disk brake, it is proposed, for example in DE 102 43 127 A1 to use an inductive signal generator as a multifunctional element with which, inter alia, temperature dependent signals are generated, said signals being compared with a setpoint value in an evaluation device and, for example, acoustic signal being output when said setpoint value is exceeded.

Document DE 44 31 045 C2 describes a sensor arrangement for jointly measuring two variables, e.g. the rotational speed of a wheel of a motor vehicle which has a brake, and the temperature of the brake means by means of an inductive sensor.

As a consequence of this, the components involved have hitherto been replaced immediately, which requires at least one down time of the vehicle, which, of course, entails considerable costs, in particular resulting from the down times of the vehicle, and under certain circumstances, from the acquisition of spare parts and the assembly and disassembly work.

The invention is based on the object of developing a method which increases the service life of the disk brake and optimizes its functional reliability.

This object is achieved in accordance with embodiments of the invention.

A method according to the invention is for avoiding overheating of a brake of a vehicle, in particular of a utility vehicle, and/or of a trailer. The method comprises the following steps.

A first temperature signal and at least one second temperature signal, in which the first temperature signal represents one temperature of the brake and/or of a functional part of the brake and in which the at least second temperature signal represents at least one further temperature of at least one further brake of the vehicle, are read in, and a brake fault state when using the first temperature signal and the second temperature signal is detected, in order to avoid on overheating of the brake.

The method according to the invention constitutes, as it were, a thermal management system which not only senses the operationally induced temperatures by means of sensors which supplies and evaluates the operationally induced temperatures as a temperature signal which represents the temperature, but when necessary adjusts the functional parts, as far as possible. In this way, by using the temperature signal a regulating signal is supplied which constitutes a reference variable for at least one functional part. In this context, the adjustment takes place under computed control. The method can be executed on a brake or in a brake system. In this context, the brake can be, for example, a disk brake or a drum brake.

That is to say, in contrast to the prior art in which there is only the possibility of activating a signal after sensing of the temperatures and after their setpoint values have been exceeded, in order to replace the respective functional parts directly, the invention permits these functional parts to change to a new operationally reliable state without replacing the corresponding component immediately. This advantageously increases the economic viability, since service lives of the wheel brakes or the respective functional parts are increased.

In one embodiment, the brake can be arranged on an axle, and the further brake can be arranged on the same axle or on a further axle. It is therefore advantageously possible to use different brakes for the examination.

In a further embodiment there is provision that in the determining step a temperature difference is determined as a difference between the temperature signal and the further temperature signal, and the fault state is determined if the temperature difference exceeds a different threshold value. The different threshold value can be determined previously, e.g. on the basis of previously determined measuring series.

A further embodiment provides, in the reading in step, reading in an additional temperature signal which represents an additional temperature of an additional brake and/or of a functional part of the additional brake, and in the determining step, determining the fault state using the additional temperature signal. Accuracy can therefore be increased.

In yet a further embodiment, in the determining step the temperature difference can be determined as a difference between the temperature signal or the temperature and a mean value of the temperature signals or of the temperatures represented by the temperature signals, in particular wherein the mean value is defined as a median, trimmed mean value, arithmetic mean and/or expected value. This is advantageous since in this way the reliability can be increased.

In this context, in yet another embodiment the signals can be passed on in a wireless fashion. This means that signals are transmitted from the sensor to the evaluation device and from there, if appropriate, to an actuator, in a wireless fashion, that is to say by radio or the like, wherein the regulation of the functional parts occurs taking into account the state of the disk brake.

The measurement of the temperature can take place directly or indirectly at various functional parts. It is therefore possible for the temperature signal which represents at least one temperature of at least one functional part to be supplied by a temperature sensor such as, for example, a thermoelement, a resistance thermometer or a contactless measuring thermometer, such as, for example, a radiation thermometer, or can be derived from another sensor signal. A corresponding sensor can be arranged, for example, on a pole wheel, on the brake disk or disk brake, on one or both brake linings or on a brake caliper part, likewise on electronic components of the type of separate or integrated thermoelements, such as are used for temperature compensation. In this case, the temperature measurement occurs at lining wear sensors which are integrated into the brake linings.

In one embodiment, the temperature measurement can be carried out using a pole wheel and/or an ABS sensor. One sensor can therefore advantageously be used for two functions. It is therefore possible for a signal amplitude of the pole wheel sensor to represent a temperature of a functional part, wherein the frequency of the rotational speed and the amplitude of the temperature correspond. However, it is to be borne in mind here that when the pole wheel is connected to the brake disk, the design thereof, depending on whether, for example, a pot disk or neck disk is used, and the position of the pole wheel, influences a time profile of the temperature signal and the level of the temperature. The method can detect these differences by means of plausibility checking of the data with an electronic brake system (EBS), wherein the brake pressure, braking duration and speed are used to determine the implemented braking energy.

Radiation pyrometers can be used as contactless temperature sensors, wherein in the case of a disk brake a radiation pyrometer is preferably supplied on both sides of the brake disk.

An infrared thermometer in the form of, for example, a narrow band pyrometer, with a germanium photodiode or indium gallium arsenide photodiode or band radiation pyrometer can be used as a radiation pyrometer, as can a quotient pyrometer.

States of the brake, such as e.g. of a disk brake, which are adversely affected thermally, result, for example, from vitrifying brake linings which occur as a result of an excessively low contact pressure and excessively low temperature at the brake linings, wherein a loss of the coefficient of friction of the brake linings occurs. This can result e.g. from the predominant use of continuous action brake systems, such as e.g. retarders and other secondary additional brake systems with braking energy recovery, such as are used for example in hybrid vehicles. Here, only a low brake pressure is applied during the braking process and only low temperatures are achieved.

In the case of the detection of an excessively low brake pressure and an excessively low temperature at the brake or the adjacent components, such as an assigned axle, a load equalization can be requested or initiated between a multiplicity of brakes. It is therefore possible, in the case of the detection of an excessively low brake pressure and an excessively low temperature at the brake or the adjacent components, such as an assigned axle, for a controller (ECU) to send a request to a closed-loop control device, with the result that in the event of the presence of vitrified linings, supporting brakes are switched off in order to increase the braking force and as a result the temperature at the brake with vitrifying linings. Supporting brakes can be retarders or recuperative brakes which are attached to the axle or the wheel. That is to say, on a case by case basis, the service brakes can be used before an engine brake and/or the retarders or recuperative brakes. It is therefore possible to apply a relatively large braking force to the vitrifying brake linings without increasing an overall deceleration of the vehicle, wherein the braking force which is increased as a result, on the vitrifying brake linings, counteracts the state of vitrification, and the coefficient of friction of the brake linings is increased again.

As a result, the base temperature of the brake, such as e.g. of a disk brake, is held at a defined increased level, with the result that the specified cold wear or the vitrification of the brake linings is avoided. This results in a marked improvement in the efficiency. This is a likewise the case for the possibility of the vehicle driver detecting, on the basis of a display, the transmitted signals when a setpoint temperature of all the disk brakes is exceeded, and of reacting accordingly, in order to avoid corresponding continuous loading of the disk brakes.

Slight constant increase in the temperature at the brake linings when a wheel is rotating can indicate a temporary fault state of the mechanical brake, e.g. of the guidance means of the brake lining or of the brake caliper guidance means.

If the state is detected, a relatively high brake pressure can be applied once to the disk brake during the next braking operation, in order to bring about a release of the jamming guidance means. Alternatively, in the case of a stationary vehicle the brake can be activated in order to bring about a release of the jamming guidance means. If this does not lead to an improvement in the malfunction, the braking request for the disk brake can be reduced and a visual and/or acoustic warning message can be triggered.

Overheating of the brake can occur owing to a malfunction which results from no longer adequate clearance for the free movement of the brake disk and of residual braking torque which occurs. Heat which occurs in such a state of a brake can give rise to a self-amplifying effect.

This residual braking torque, caused by thermal expansion of the brake disk and/or brake linings, can be compensated by actively moving the brake linings away from the brake disk (increasing the clearance), e.g. by means of a bidirectional re adjusting element. This actively controlled increase in the clearance can be initiated using the invention. It is therefore possible to return the brake to a functionally capable state, or avoid undesired faulty behavior, by a one off large braking request and/or by reducing the braking request.

As already mentioned with respect to the prior art, long-lasting downhill travel can lead to continuously increased temperature of the disk brake, resulting in an unacceptable operating state.

By means of the invention, there is the possibility, in the case of long-lasting high temperatures during a braking operation, to distribute the braking request between the brakes or disk brakes which are assigned to the respective wheels, in such a way that it is not one brake or the brakes of an axle which are stressed with an increased temperature but rather all the brakes in such a way that the temperature at the hottest disk brake is reduced. In this context, the braking request to this brake is reduced and the braking request to the others is increased, with the same or even increased vehicle deceleration.

The thermal state of the brakes can be optimized in that the distribution of the braking request takes place only in a stable driving range, i.e. in the low brake pressure and deceleration range. In this context, the braking performance between a multiplicity of brakes of one axle can be equalized. In this context, equalization of the braking performance can take place between brakes of a multiplicity of axles. In order to obtain the performance in the case of emergency braking and full braking, the braking request distribution can be limited to the stable driving range. The stable driving range can be arranged in the low brake pressure and deceleration range, with the result that the effectiveness of the brake can be optimized depending on the thermal operational state.

If the evaluation unit detects a reduction in the frictional work of a brake, e.g. as a result of a reduced temperature emission or a reduced emission value, and therefore a reduced coefficient of friction of the friction pairing, what is referred to as cleaning braking can be initiated. The described state can be caused by preceding high thermal stressing, e.g. in the case of a disk brake, in particular with transfer of material to the brake disk or as a result of a brake which has been used little over a relatively long period of time, which is also referred to as brake linings "which have gone to sleep."

For a cleaning braking, in the case of adaptive braking of less than 0.3 g, the braking may advantageously be distributed among the brakes unequally, i.e. within stable driving parameters, with the result that the brake which is adversely affected thermally comprises a braking pressure request, which causes the brake lining surface to be cleaned. Brakes which are not thermally loaded receive a braking request which is reduced by this amount.

For this purpose, there is provision in a further embodiment that when an increase in the temperature which is constant in a tolerance range, is determined once at brake linings of the brake, in particular when a wheel is rotating, during a subsequent operationally induced braking operation, said braking operation takes place at a relatively high brake pressure, in particular with a continuous braking power of the vehicle, and/or the brake is activated at least once when the vehicle is stationary.

In the case of braking requests for an emergency stop, i.e. of greater than 0.3 g or an ABS control situation, the braking request is not distributed. The equalization of the braking request can also take place in a diagonal fashion, i.e. for example front right and rear left. It is therefore advantageously possible to maintain a stable driving state.

The level of the temperature and the time profile of the increase in temperature and decrease in temperature after a braking operation has taken place can be differentiated between two vehicles on the basis of a wide variety of vehicle configurations and wheel house configurations, for example in the case of buses and trucks. This can be mapped in an analogous model. In order to obtain corresponding parameters here it is possible to check, after the application of the brake pressure, the time in which a temperature is set.

In this context, the signal which is output can be checked by comparison with other wheels or brakes of the vehicle. The analogous model can map the conduction of heat or the transfer of heat and additionally or alternatively the thermal capacity and cooling of the brake, of the adjacent components and additionally or alternatively of the surroundings.

A controller according to the invention for executing the method, for avoiding an overheating of a brake of a vehicle, in particular of a utility vehicle and/or of a trailer, has the following devices: an interface for reading in a first temperature signal and at least one second temperature signal, wherein the first temperature signal represents a temperature of the brake and/or of a functional part of the brake, and wherein the at least second temperature signal represents at least one further temperature of at least one further brake of the vehicle; and device for determining a fault state of the brake using the first temperature signal and the second temperature signal, in order to avoid overheating of the brake.

The controller can be embodied to carry out or implement the steps of a variant of a method present here in corresponding devices. A controller can be understood to be an electrical apparatus or an electrical circuit, for example an integrated circuit. A controller can also be understood to be a closed loop control device, an ECU or an open loop control device. The controller can be part of an electronic brake system. The controller can be designed to receive and output signals via suitable interfaces. The idea on which the invention is based can also be efficiently implemented by means of the controller.

A controller can be understood to be here an electrical apparatus which processes sensor signals and outputs control signals and/or data signals as a function of the sensor signals. The interfaces of the control device can be implemented by means of hardware and/or software. In the case of a hardware implementation, the interfaces can be, for example, part of a so called ASIC system, which includes a wide variety of functions of the control device. However, the interfaces can also be implemented as separate integrated circuits, or can be composed at least partially of discrete components. In the case of a software implementation, the interfaces can be software modules which are present, for example, on a microcontroller, along with other software modules.

A brake for a vehicle, in particular a utility vehicle and/or a trailer, is designed to supply a temperature signal for avoiding an overheating of the brake.

A brake system for a vehicle, in particular, a utility vehicle and/or a trailer, comprises the controller described above, a first brake described above arranged on an axle and a second brake described above which is arranged on the same axle and/or on a further axle.

A vehicle, in particular a utility vehicle and/or a trailer, has the brake system described above.

A computer program product with program code which can be stored on a machine readable carrier such as a semiconductor memory and is used to carry out the method according to one of the embodiments described above is also advantageously used if the computer program product is executed on a control device or the controller described above.

Moreover, the method according to the invention can also be updated by means of an update of a software for an electronic brake system (EBS) in such a way that new fault states such as are determined in the field mode or in the field trial are stored.

By means of the information on the temperature and the wear, the brakes can be operated in such a way that the braking performance including the brake wear is optimized.

The downtimes, in particular the brake linings of the individual brakes which come into use on a vehicle can therefore be approximated.

In the case of a fault state and/or when the constant relatively high temperature is detected after a braking operation, in one exemplary embodiment an acoustic and additionally or alternatively visual signal can be output. In this way, a driver can be alerted early to the fault state, as a result of which a time interval until the fault is eliminated can be reduced.

As a further advantage, it becomes apparent in yet another embodiment that the determined fault state can be transmitted by means of a logbook system or geolocalization system to a workshop for the provision of a spare part, or for planning a service interval. In other words, predictive spare part supply can be made possible by means of a logbook system or a geolocalization system and a forwarding of information to workshops by telecommunication. This relates, in particular, to the supplying of spare parts such as brake linings, replacement brakes and the planning of service intervals, which is possible by means of the thermal detection of the state of the disk brake.

Other objects, advantages and novel features of the present invention will become apparent from the following detailed description of one or more preferred embodiments when considered in conjunction with the accompanying drawings.

BRIEF DESCRIPTION OF THE DRAWINGS

Preferred exemplary embodiments of the present invention will be explained in more detail below.

DETAILED DESCRIPTION OF THE DRAWINGS

In the following description of the preferred exemplary embodiments of the present invention, identical or similar reference symbols are used for the elements, which are illustrated in the various drawings and similarly acting elements, wherein a repeated description of these elements is omitted.

Figure 1:
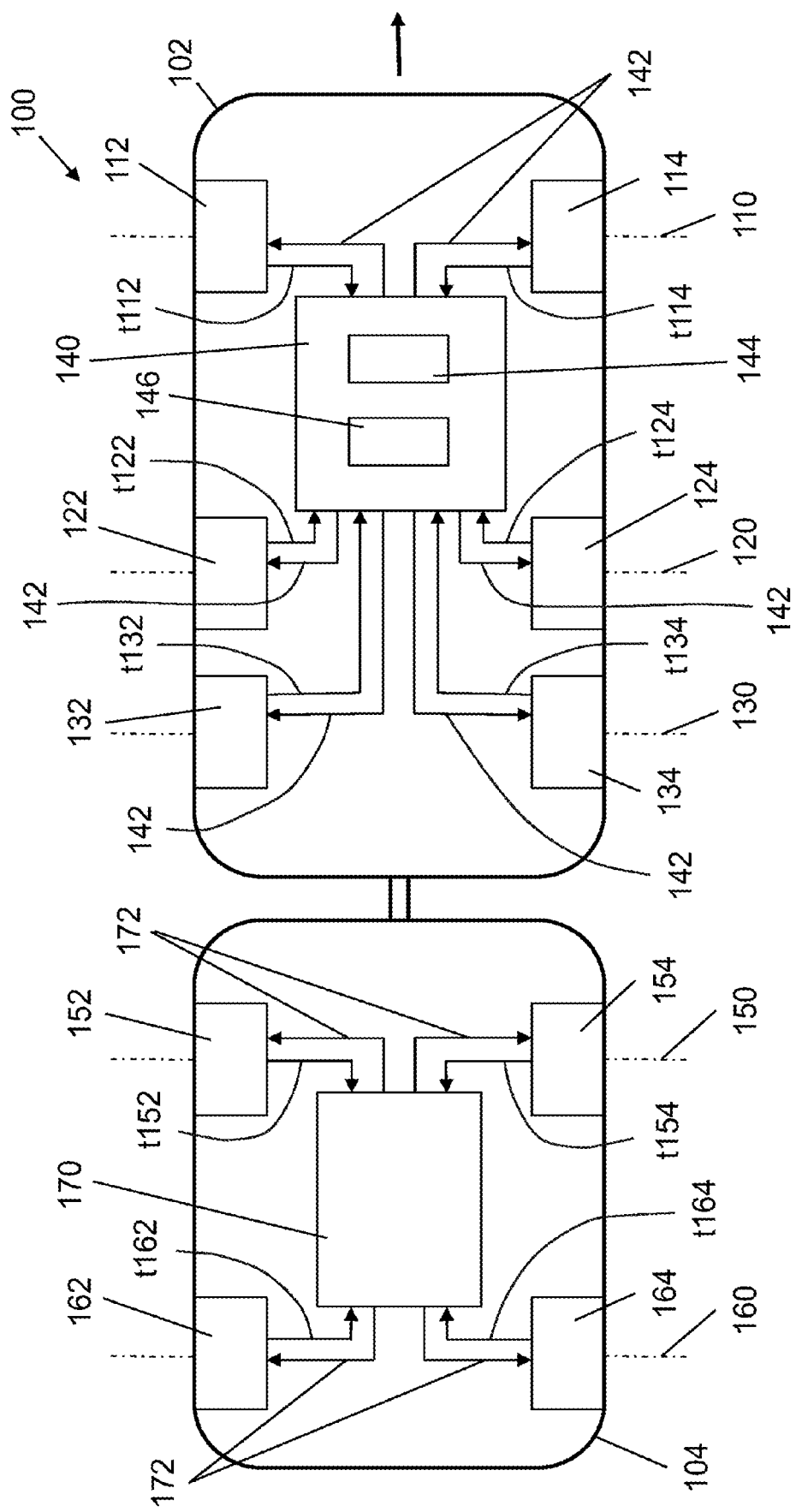
FIG. 1 shows a schematic block illustration of a vehicle with a brake system according to an exemplary embodiment of the present invention.

FIG. 1 shows a schematic block illustration of a vehicle 100 with a brake system according to an exemplary embodiment of the present invention. In the illustrated exemplary embodiment, the vehicle 100 comprises a utility vehicle 102 and a trailer 104. A forward direction of travel is indicated with an arrow.

The utility vehicle 102 has three axles 110, 120, 130, each with two brakes 112, 114, 122, 124, 132, 134, wherein in each case one brake 112, 122, 132 is arranged on the right hand side of the vehicle in the direction of travel of the utility vehicle 102, and one brake 114, 124, 134 is arranged on the left hand side of the vehicle. Furthermore, the utility vehicle 102 has a controller 140. The brakes are designed each to supply at least one temperature signal $t112$, $t114$, $t122$, $t124$, $t132$, $t134$, which temperature signal is fed to the controller 140 via a respective signal line and read in by the controller 140. The controller 140 is designed to supply at least one braking request signal 142. The braking request signal 142 is transmitted to each brake 112, 114, 122, 124, 132, 134 via a respectively associated signal line. In a preferred exemplary embodiment, one braking request signal 142 is supplied per axle 110, 120, 130.

The trailer 104 has two axles 150, 160, each of which has two brakes 152, 154, 162, 164, wherein in each case one brake 152, 162 is arranged on the right hand side of the vehicle in the direction of travel of the trailer 104, and one brake 154, 164 is arranged on the left hand side of the vehicle. Furthermore, the trailer 104 has a trailer controller 170. The brakes 152, 154, 162, 164 are each designed to supply at least one temperature signal $t152$, $t154$, $t162$, $t164$, which temperature signal is fed to the trailer controller 170 via a respective signal line and read in by the trailer controller 170. The trailer controller 170 is designed to supply at least one braking request signal 172. The braking request signal 172 is transmitted to each brake 152, 154, 162, 164 via a respectively associated signal line. In a preferred exemplary embodiment, one braking request signal 172 is supplied per axle 150, 160.

The controller 140 for avoiding overheating of a brake of a vehicle, in particular of a utility vehicle and/or of a trailer, comprises an interface 144 for reading in a first temperature signal and at least one second temperature signal, wherein the first temperature signal represents a temperature of the brake and/or of a functional part of the brake, and wherein the at least second temperature signal represents at least one further temperature of at least one further brake of the vehicle, and a determining device 146 for determining a fault state of the brake using the first temperature signal and the second temperature signal, in order to avoid overheating of the brake. In the exemplary embodiment illustrated in FIG. 1, the interface 144 for reading in is designed to read in the temperature signals $t112$, $t114$, $t122$, $t124$, $t132$, $t134$ of the brakes of the utility vehicle 102. The controller 140 is designed to detect a fault state of a brake if the respective temperature of this brake deviates from a mean value of the temperatures of all the brakes by a temperature difference which is greater than a threshold value.

The trailer controller 170 of the trailer 104 corresponds essentially in functional terms to the controller 140 of the utility vehicle, with the difference that the temperature signals $t152$, $t154$, $t162$, $t164$ of the brakes 152, 154, 162, 164 of the trailer 104 are read-in and monitored.

In an exemplary embodiment which is not shown, the functionality of the trailer controller 170 of the trailer 104 is integrated into the controller 140 of the utility vehicle 102.

In one exemplary embodiment which is not shown, the controller 140 of the utility vehicle 102 and the trailer controller 170 of the trailer 104 are coupled to one another. Therefore, when a fault state occurs and is detected, a braking request can be distributed between the trailer 104 and the utility vehicle 102. In another exemplary embodiment, the two controllers 140, 170 operate independently of one another. In a further exemplary embodiment, the vehicle 100 has a controller 140 which distributes a braking request among the axles 110, 120, 130 of the utility vehicle 102 and the axles 150, 160 of the trailer 104 when a fault state is detected.

If a fault state, that is to say a hot-running brake, is detected, when there is a normal braking request the controller 140 cannot take into account the respective brake or alternatively the brakes of the affected axle with a hot-running brake and distribute the braking request to the remaining brakes. Only if the requested deceleration exceeds a comparison value is the braking request transmitted to all the brakes, irrespective of the hot-running brake, in order to achieve maximum deceleration.

In one exemplary embodiment, an ABS sensor or a pole wheel is used in order to detect the temperature. For example, as is presented in Laid-Open Patent Application DE 102 43 127 A1, a pole wheel is used with an inductive sensor, wherein in one exemplary embodiment the amplitude of the sensor signal is evaluated in order to determine a temperature. In an alternative exemplary embodiment, a change in resistance of the respective sensor is monitored in order to determine the temperature. In this respect, reference is made to document DE 44 31 045 C2. Alternatively, other measuring methods for determining and detecting the temperature are used.

Figure 2:
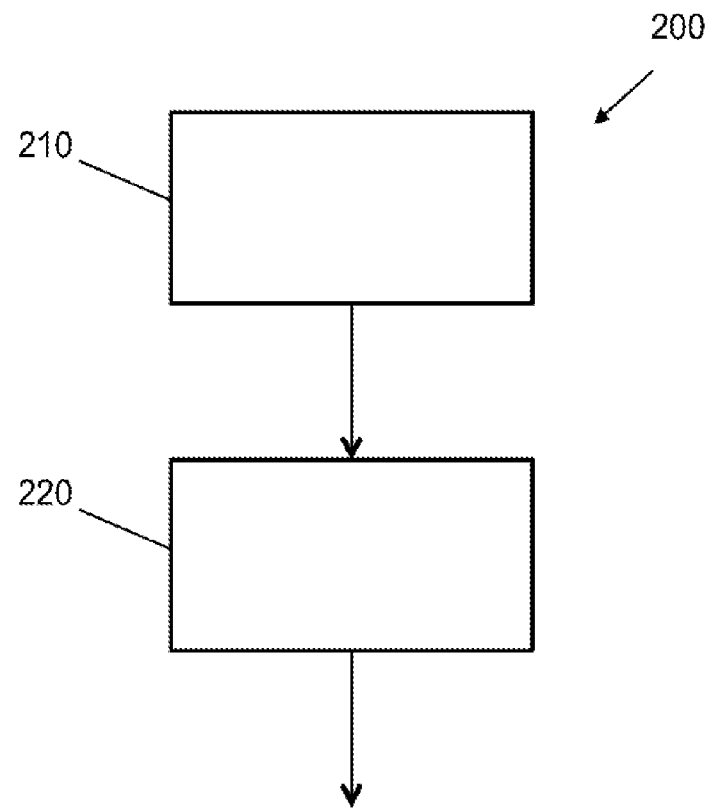
FIG. 2 shows a flowchart of a method according to one exemplary embodiment of the present invention.

FIG. 2 shows a method 200 according to an exemplary embodiment of the present invention. The method 200 for avoiding an overheating of a brake of a vehicle, in particular of a utility vehicle and/or of a trailer, comprises a reading in step 210, and a detecting step 220. The vehicle can be a variant of an exemplary embodiment (shown in FIG. 1) of a vehicle 100.

In the reading in step 210, a first temperature signal of a first brake of the brakes 112, 114, 122, 124, 132, 134, 152, 154, 162, 164 of the vehicle 100 and a second temperature signal of a second brake of the brakes 112, 114, 122, 124, 132, 134, 152, 154, 162, 164 of the vehicle 100 are read in. In the subsequent determining step 220 a fault state is determined using the temperature signals. A fault state is determined if one of the brakes 112, 114, 122, 124, 132, 134, 152, 154, 162, 164 of the vehicle 100 runs hot. This can be caused by a mechanical fault, such as for example a jamming guide means, with the result that the respective brake is not completely released and therefore has a braking effect even in the unactuated state, which leads to a production of heat. Since the measured temperature depends on the respective brake, the type of installation, the installation location of the temperature sensor and further factors, it is difficult to output the fault state when an absolute temperature is reached. For a specific vehicle configuration the absolute measured temperature can also be compared with a threshold value or comparison value or reference value in order to detect a fault state.

In the method described here, a brake is identified if the temperature deviates from the mean of all the brakes by more than a defined tolerance range.

In order to prevent further heating, in one exemplary embodiment the affected brake is not activated in the case of braking processes below a defined braking deceleration. If the required deceleration exceeds the defined deceleration threshold value, for example in the event of an emergency stop or full braking, all the brakes are actuated irrespective of a detected fault state.

If a fault state is detected, in one exemplary embodiment an acoustic and additionally or alternatively a visual signal is output. Furthermore, in one particular exemplary embodiment the fault state is transmitted for servicing purposes to an infrastructure device, for example for maintenance purposes or for the acquisition of spare parts. This can take place in parallel with the transmission of other parameters of an electronic logbook.

When a fault state is detected, a further method step can be provided in order to eliminate or reduce the fault state. It is therefore possible in the case of a subsequent operationally induced braking request to increase the braking request to the affected brake in order, for example, to release again a clamping guide means. Alternatively or additionally, in the case of a stationary state of the vehicle 100 the affected brake can be actuated, in particular actuated repeatedly, in order to bring about a movement of the moveable parts of the brake without a braking torque, and therefore achieve a fault-free state of the brake again.

The exemplary embodiments described are selected only by way of example and can be combined with one another.

LIST OF REFERENCE NUMBERS

100 Vehicle
102 Utility vehicle
104 Trailer
110, 120, 130 Axle
112, 114 Brake
122, 124 Brake
132, 134 Brake
t112, t114 Temperature signal
t122, t124 Temperature signal
t132, t134 Temperature signal
140 Controller
142 Braking request signal
144 Interface
146 Detecting device
150, 160 Axle
152, 154 Brake
162, 164 Brake
t152, t154 Temperature signal
t162, t164 Temperature signal
170 Trailer controller
172 Braking request signal The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for avoiding overheating of a brake of at least one of a utility vehicle, a trailer, and both a utility vehicle and a trailer, comprising:
    reading in a first temperature signal representing a temperature of the brake, a functional part of the brake, or both the brake and the functional part of the brake;
    reading in at least one second temperature signal representing at least one further temperature of at least one further brake of the vehicle;
    determining a fault state of the brake using the first temperature signal and the second temperature signal;
    distributing a braking request between the utility vehicle and the trailer or among axles of the utility vehicle and the trailer upon determining the fault state in order to avoid overheating of the brake; and
    when an increase, constant in a tolerance range, in the temperature of brake linings of the brake is ascertained, with a rotating wheel, performing a braking operation at a relatively high brake pressure, once during a subsequent operational braking operation, with an unchanged braking performance of the vehicle, and/or applying the brake at least once when the vehicle is stationary.

2. The method as claimed in claim 1, wherein the brake is arranged on an axle, and the at least one further brake is arranged on the same axle or on a further axle.

3. The method as claimed in claim 1, wherein for determining the fault state, a temperature difference is determined as a difference between the first temperature signal and the further temperature signal, and the fault state is determined if the temperature difference exceeds a difference threshold value.

4. The method as claimed in claim 1, wherein, when reading in the first temperature signal, an additional temperature signal is read in, which additional temperature signal represents an additional temperature of an additional brake and/or of a functional part of the additional brake, and wherein, when determining the fault state, the fault state is determined using the additional temperature signal.

5. The method as claimed in claim 4, wherein, when determining the fault state, the temperature difference is determined as a difference between the temperature signal or the temperature and a mean value of the temperature signals or of the temperature represented by the temperature signals, and wherein the mean value is defined as at least one of a median, a trimmed mean value, an arithmetic mean, and an expected value.

6. The method as claimed in claim 2, wherein, in the event of a fault state and/or when a constant, relatively high temperature is detected after braking, an acoustic and/or visual signal is output.

7. The method as claimed in claim 1, wherein a detected fault state is transmitted via a logbook system or geolocalization system to a workshop for supplying a spare part or planning a service interval.

8. The method as claimed in claim 1, wherein measurement of at least one temperature is carried out using a pole wheel and/or an ABS sensor.

9. The method as claimed in claim 1, characterized in that the signals are passed on in a wireless fashion.

10. The method as claimed in claim 2, wherein for determining the fault state, a temperature difference is determined as a difference between the first temperature signal and the further temperature signal, and the fault state is determined if the temperature difference exceeds a difference threshold value.

11. The method as claimed in claim 2, wherein, when reading in the first temperature signal, an additional temperature signal is read in, which additional temperature signal represents an additional temperature of an additional brake and/or of a functional part of the additional brake, and wherein, when determining the fault state, the fault state is determined using the additional temperature signal.

12. The method as claimed in claim 11, wherein, when determining the fault state, the temperature difference is determined as a difference between the temperature signal or the temperature and a mean value of the temperature signals or of the temperature represented by the temperature signals, and wherein the mean value is defined as at least one of a median, a trimmed mean value, an arithmetic mean, and an expected value.

13. The method as claimed in claim 2, wherein a detected fault state is transmitted via a logbook system or geolocalization system to a workshop for supplying a spare part or planning a service interval.

14. The method as claimed in claim 3, wherein a detected fault state is transmitted via a logbook system or geolocalization system to a workshop for supplying a spare part or planning a service interval.

15. The method as claimed in claim 4, wherein a detected fault state is transmitted via a logbook system or geolocalization system to a workshop for supplying a spare part or planning a service interval.

16. A controller for executing the method as claimed in claim 1, the controller comprising:
   an interface for reading in the first temperature signal and at least the second temperature signal; and
   a determining device for determining the fault state of the brake using the first temperature signal and the second temperature signal, in order to avoid overheating of the brake.

17. A brake system for at least one of a utility vehicle, a trailer, and a utility vehicle and a trailer, comprising:
   a controller for executing the method of claim 1;
   a first brake, arranged on an axle, the brake designed to supply one of the first and second temperature signals; and
   a second brake, arranged on the axle or on a further axle, the second brake designed to supply another of the first and second temperature signals.

18. A utility vehicle, a trailer, or a utility vehicle and a trailer, having a brake system as claimed in claim 17.

19. A computer program product with program code for carrying out the method of claim 1, wherein the computer program product is executed on a controller comprising:
   an interface for reading in the first temperature signal and at least the second temperature signal; and
   a determining device for determining the fault state of the brake using the first temperature signal and the second temperature signal, in order to avoid overheating of the brake.

* * * * *